(12) United States Patent
Taylor et al.

(10) Patent No.: US 10,207,731 B2
(45) Date of Patent: Feb. 19, 2019

(54) EXPANDABLE CHILD CARRIER

(71) Applicant: Wonderland Switzerland AG, Steinhausen (CH)

(72) Inventors: Andrew J. Taylor, Mohnton, PA (US); Curtis M. Hartenstine, Birdsboro, PA (US); Robert E. Haut, West Chester, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 15/818,982

(22) Filed: Nov. 21, 2017

(65) Prior Publication Data

US 2018/0162436 A1 Jun. 14, 2018

Related U.S. Application Data

(60) Provisional application No. 62/433,401, filed on Dec. 13, 2016.

(51) Int. Cl.
*B62B 7/06* (2006.01)
*B62B 7/00* (2006.01)
*B62B 9/28* (2006.01)

(52) U.S. Cl.
CPC ............. *B62B 7/06* (2013.01); *B62B 7/008* (2013.01); *B62B 9/28* (2013.01); *B62B 2301/10* (2013.01)

(58) Field of Classification Search
CPC .. B62B 7/06; B62B 7/008; B62B 7/08; B62B 7/083; B62B 9/28; B62B 2301/10
USPC ................. 280/38, 642, 647, 650, 657, 658; 180/209
See application file for complete search history.

(56) References Cited

U.S. PATENT DOCUMENTS

| 3,504,925 | A | * | 4/1970 | Glaser | B62B 7/08 |
| | | | | | 280/650 |
| 6,017,051 | A | | 1/2000 | Thimmig | |
| 6,739,616 | B2 | * | 5/2004 | Lin | B62B 7/08 |
| | | | | | 188/20 |
| 6,981,709 | B2 | * | 1/2006 | Saint | B62B 7/04 |
| | | | | | 280/43 |
| 8,366,141 | B2 | * | 2/2013 | Crisp | B62B 7/123 |
| | | | | | 280/47.38 |
| 9,266,549 | B2 | * | 2/2016 | Jane Santamaria | B62B 7/06 |
| 2010/0270763 | A1 | | 10/2010 | Nassaux et al. | |

FOREIGN PATENT DOCUMENTS

FR 2950307 A1 3/2011

OTHER PUBLICATIONS

Search Report issued to European counterpart application No. 17204060.2 by the EPO dated May 14, 2018.

* cited by examiner

*Primary Examiner* — John D Walters
(74) *Attorney, Agent, or Firm* — Hamre, Schumann, Mueller & Larson, P.C.

(57) ABSTRACT

An expandable child carrier includes a base frame, a pivot frame, at least one first wheel unit and at least one second wheel unit. The pivot frame is pivoted to the base frame. The first wheel unit is mounted to the base frame. The second wheel unit is mounted to the pivot frame. A distance between the second wheel unit and the first wheel unit is adjusted upon the pivotal movement of the pivot frame relative to the base frame.

19 Claims, 4 Drawing Sheets

EXPANDABLE CHILD CARRIER

CROSS-REFERENCE TO RELATED APPLICATION

This application claims priority of U.S. Provisional Patent Application No. 62/433,401, filed on Dec. 13, 2016.

FIELD

The disclosure relates to a child carrier, and more particularly to an expandable child carrier.

BACKGROUND

A conventional compact multi-child stroller includes two child seats that are arranged in the front-rear direction. For the sake of compactness, the conventional stroller has a relatively small wheelbase (i.e., the distance between the rotating axes of the front and rear wheels thereof). However, for stability consideration, the orthographic projection of the center of gravity of each of the child seats is preferred to be located within a region bounded by the rotating axes of the front and rear wheels of the conventional stroller. As such, a space between the child seats of the conventional stroller may be relatively small. A modification of the abovementioned conventional stroller may have a relatively large wheelbase, so a space between the child seats thereof is relatively large. However, the relatively large length thereof (due to the larger wheelbase) may be unwanted when the use of one of the child seats is not needed.

SUMMARY

Therefore, an object of the disclosure is to provide an expandable child carrier that can alleviate at least one of the drawbacks of the prior arts.

According to the disclosure, the expandable child carrier includes a base frame, a pivot frame, at least one first wheel unit and at least one second wheel unit. The pivot frame is pivoted to the base frame. The first wheel unit is mounted to the base frame. The second wheel unit is mounted to the pivot frame. A distance between the second wheel unit and the first wheel unit is adjusted upon the pivotal movement of the pivot frame relative to the base frame.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
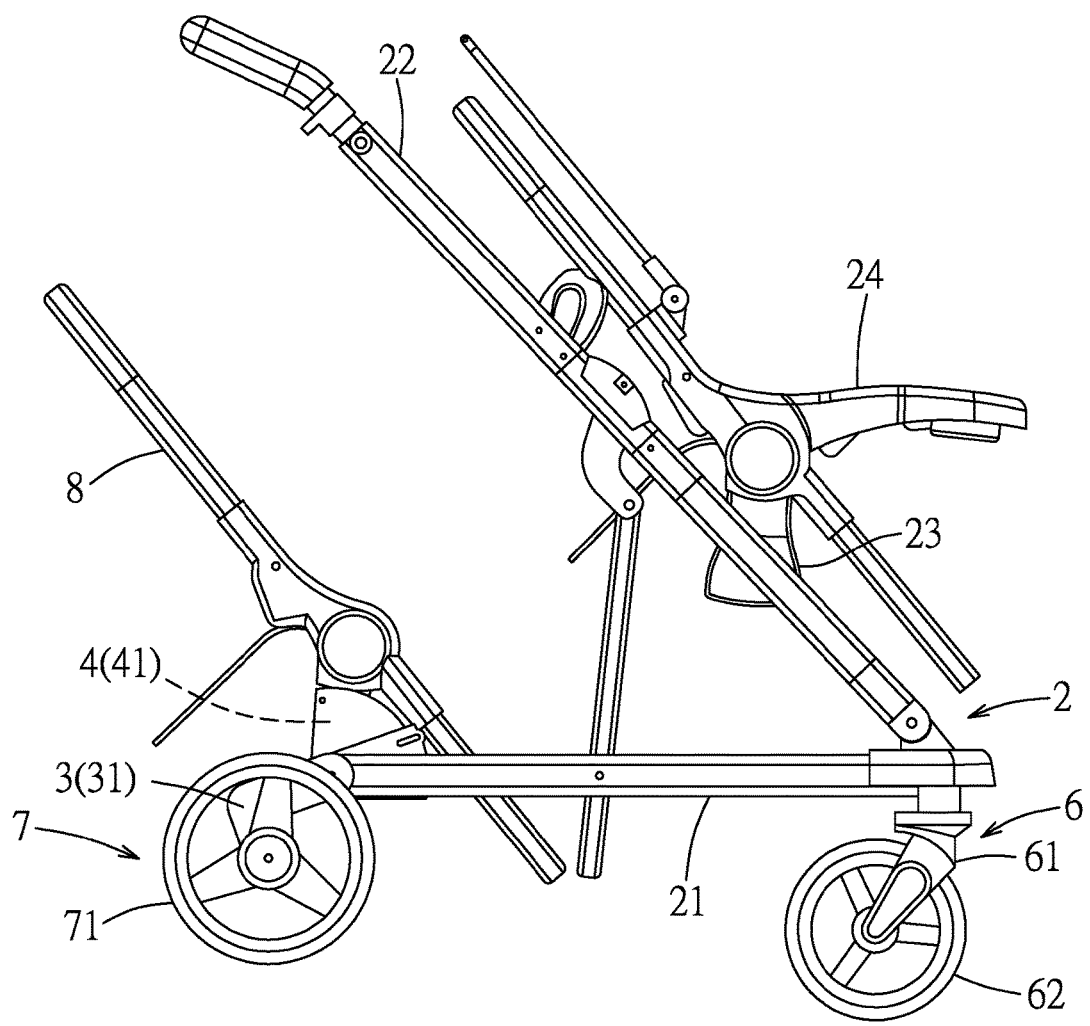
FIG. 1 is a side view illustrating a first embodiment of the expandable child carrier according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
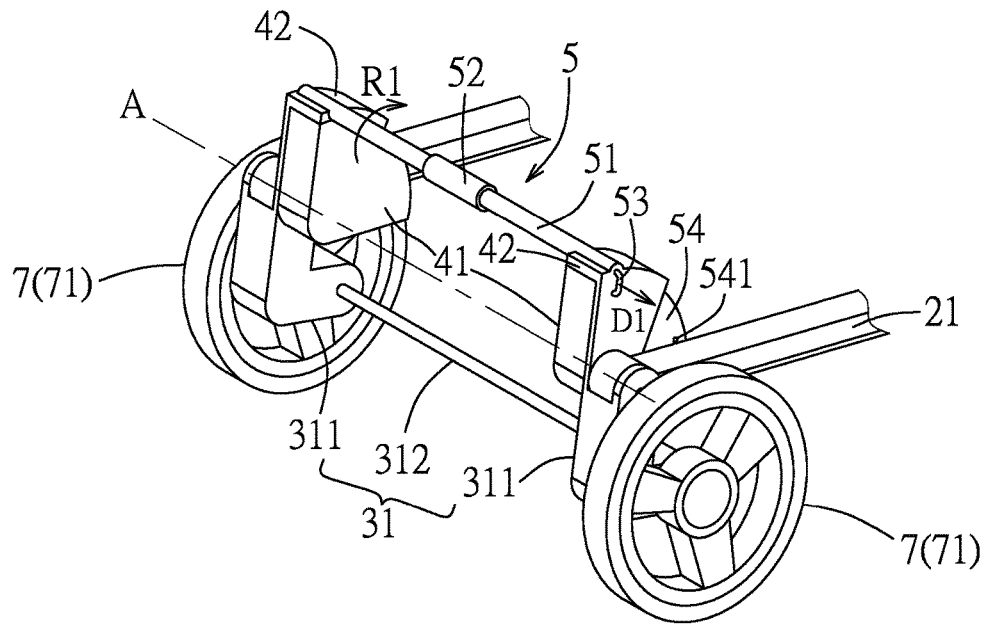
FIG. 2 is a schematic fragmentary perspective view illustrating a pivot frame of the first embodiment at a retracted position.

Referring to FIGS. 1 and 2, the first embodiment of the expandable child carrier according to the disclosure includes a main frame unit 2, a pivot frame unit 3, at least one first wheel unit 6 and two second wheel units 7. In one embodiment, the expandable child carrier may be configured as stroller.

The main frame unit 2 includes a base frame 21, a handle frame 22 that is connected to a front portion of the base frame 21 and that extends upwardly and rearwardly, a first mount module 23 that is mounted to the handle frame 22, and a first seat 24 that may be fixedly or removably mounted to the first mount module 23.

The first wheel unit 6 is mounted to the front portion of the base frame 21. In one embodiment, the first wheel unit 6 is configured as a swivel wheel assembly, and includes a first housing 61 that is rotatably mounted to the front portion of the base frame 21, and a first wheel 62 that is rotatably mounted to the first housing 61.

The pivot frame unit 3 includes a pivot frame 31 that is pivoted to a rear portion of the base frame 21 and that is pivotable relative to the base frame 21 about a pivot axis (A, see FIG. 2). In one embodiment, the pivot frame 31 includes two L-shaped pivot frame parts 311 that are respectively pivoted to two opposite lateral ends of the rear portion of the base frame 21, and an axle member 312 (see FIG. 2) that interconnects the pivot frame parts 311. The configuration of the pivot frame 31 is not limited to such.

The second wheel units 7 are mounted to the pivot frame 31. In one embodiment, each of the second wheel units 7 includes a second wheel 71 that is rotatably mounted to a respective one of the pivot frame parts 311 of the pivot frame 31. A distance between the rotating axis of the second wheels 71 of the second wheel units 7 and the rotating axis of the first wheel 62 of the first wheel unit 6 is adjusted upon the pivotal movement of the pivot frame 31 relative to the base frame 21.

The expandable child carrier may further include an operation unit 5 (see FIG. 2) that is operable for pivoting the pivot frame 31 relative to the base frame 21. The operation unit 5 includes a handle 51, a knob 52, a latch member 53 and a positioning seat 54.

The handle 51 is co-movably mounted to the pivot frame 31, and is spaced apart from the pivot axis (A) about which the pivot frame 31 pivots relative to the base frame 21.

The positioning seat 54 is fixedly mounted to the base frame 21, and is formed with two positioning grooves 541.

Figure 3:
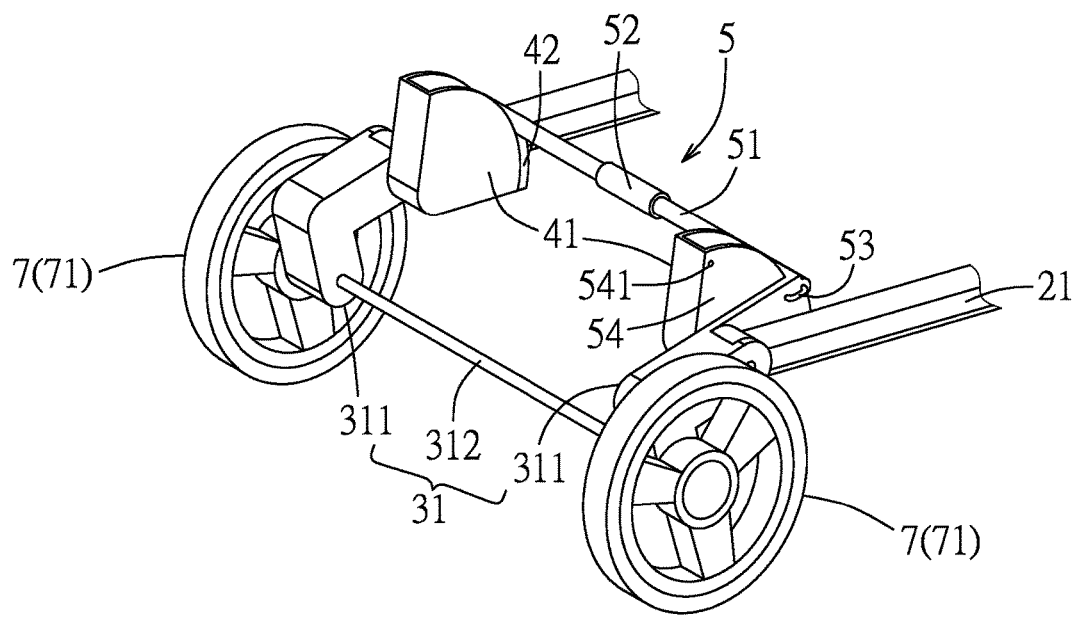
FIG. 3 is another schematic fragmentary perspective view illustrating the pivot frame at an extended position.

The latch member 53 is movably mounted to the handle 51, and removably engages either one of the positioning grooves 541 for positioning the pivot frame 31 relative to the base frame 21 at a retracted position (see FIGS. 2 and 4) where the distance between the rotating axes of the first and second wheels 62, 71 is relatively small, or an extended position (see FIGS. 3 and 5) where the distance between the rotating axes of the first and second wheels 62, 71 is relatively large. In one embodiment, the latch member 53 is configured as a C-shaped latch.

The knob 52 is movably mounted to the handle 51, and is associated with the latch member 53 by virtue of a transmission mechanism (not shown) such as a cam mechanism or a linkage mechanism. In one embodiment, rotation of the knob 52 relative to the handle 51 in a first actuating direction (R1, see FIG. 2) moves the latch member 53 in a first moving direction (D1, see FIG. 2) to disengage from one of the positioning grooves 541 by virtue of the transmission mechanism, so as to permit the pivot frame 31 to move relative to the base frame 21 between the retracted position and the extended position. In a modification, the knob 52 may be configured to be depressed relative to the handle 51 to drive movement of the latch member 53 via the transmission mechanism.

Figure 4:
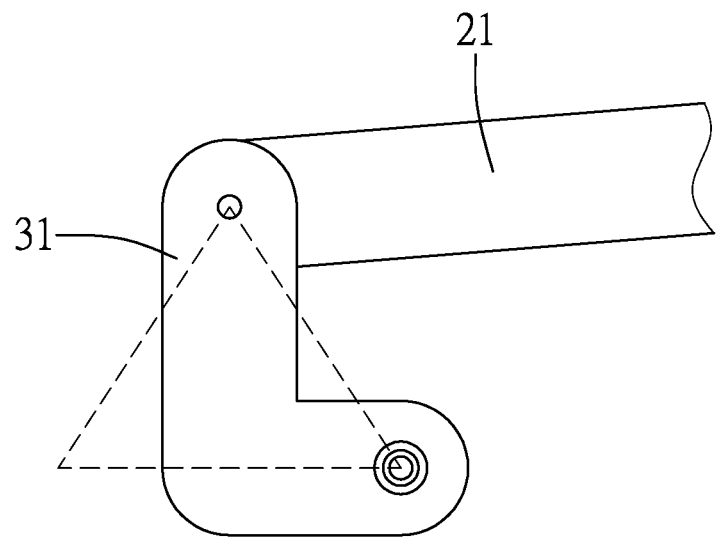
FIG. 4 is a schematic fragmentary side view illustrating the pivot frame at the retracted position.
Figure 5:
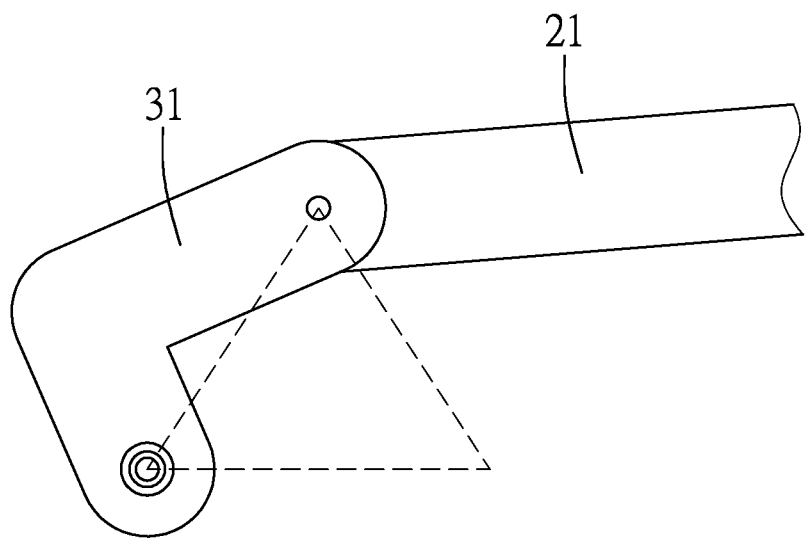
FIG. 5 is another schematic fragmentary side view illustrating the pivot frame at the extended position.

With particular reference to FIGS. 4 and 5, preferably, the positioning grooves 541 of the positioning seat 54 are configured to be located such that, a distance between the ground (not shown) and the rear portion of the base frame 21 at the time that the pivot frame 31 is at the retracted position is the same to that between the ground and the rear portion of the base frame 21 at the time that the pivot frame 31 is at the extended position (with reference to the triangle depicted by broken lines in each of FIGS. 4 and 5). Accordingly, the main frame unit 2 substantially remains level when the pivot frame 31 is at the retracted position and the extended position, so as to maintain the same seat angle. Moreover, a substantially vertical orientation of a king pin (not shown) of the first wheel unit 6 is also maintained for the front swivel so that it will swivel properly. It should be noted that, in a modification, a distance between the ground and the base frame 21 at the time that the pivot frame 31 is at the retracted position is different from that at the time that the pivot frame 31 is at the extended position. In another modification, the locations or the number of the positioning grooves 541 of the positioning seat 54 may be modified such that the pivot frame 31 can be positioned relative to the base frame 21 at different positions.

In one embodiment, the handle 51 may be located such that a user can push the handle 51 forwardly to move the pivot frame 31 toward the extended position, and can pull the handle 51 rearwardly to move the pivot frame 31 toward the retracted position.

Referring back to FIGS. 1 and 2, the expandable child carrier may further include a second mount module 4 on which a second seat 8 is removably mounted. In one embodiment, the second mount module 4 includes two second mounts 41 that are respectively and fixedly mounted to the opposite lateral ends of the rear portion of the base frame 21, and two mount blocks 42 that are respectively and co-movably mounted to the pivot frame parts 311 of the pivot frame 31. Preferably, each of the mount blocks 42 blocks a respective one of the second mounts 41 when the pivot frame 31 is at the retracted position so as to prevent the second mounts 41 from being mounted with the second seat 8, and unblocks the respective one of the second mounts 41 when the pivot frame 31 is at the extended position so as to permit the second mounts 41 to be mounted with the second seat 8. In one embodiment, the positioning seat 54 of the operation unit 5 is integrally formed with one of the second mounts 41, and the handle 51 is co-movably mounted to the mount blocks 42. In a modification, the second mount module 4 may be co-movably mounted to the pivot frame 31, and may be accessible to the second seat 8 only when the pivot frame 31 is at the extended position.

The advantages of the expandable child carrier according to the disclosure are as follows:

1. When the use of the second seat 8 is not needed, the second seat 8 can be removed from the second mounts 41 of the second mount module 4, and the pivot frame 31 can be moved to the retracted position so that the expandable child carrier is relatively compact.

2. When the use of both of the first and second seats 24, 8 is needed, the pivot frame 31 is moved to the extended position, and the second seat 8 is mounted the second mounts 41 of the second mount module 4. Since the distance between the rotating axes of the first and second wheels 62, 71 is relatively large when the pivot frame 31 is at the extended position, a space between the first and second seats 24, 8 may be relatively large.

Figure 6:
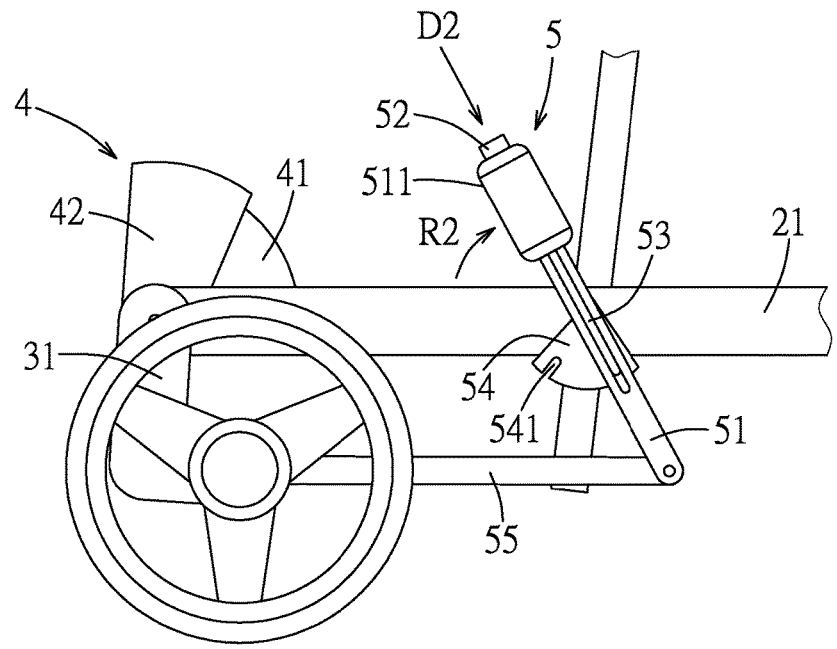
FIG. 6 is a schematic fragmentary side view illustrating a pivot frame of a second embodiment of the expandable child carrier according to the disclosure at a retracted position.
Figure 7:
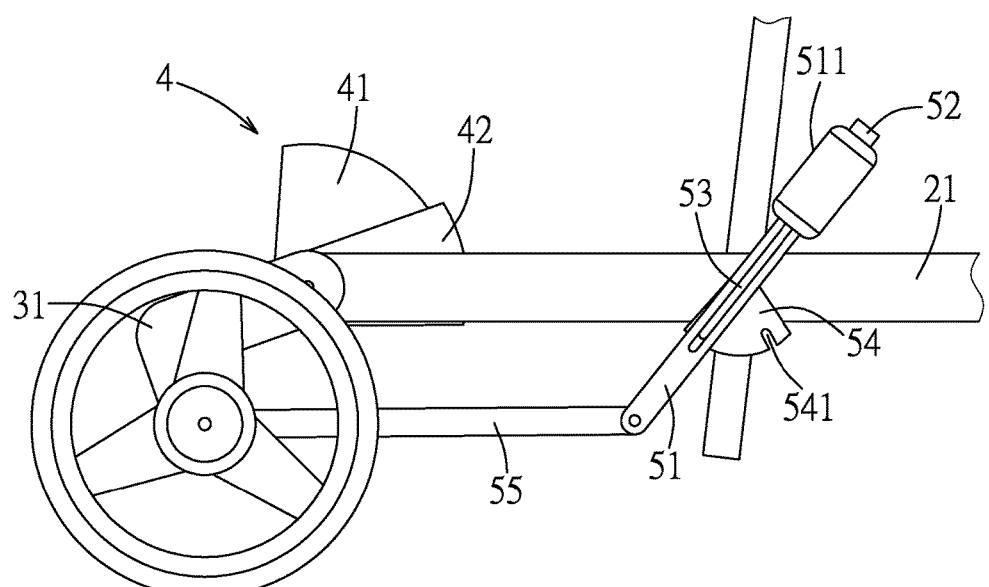
FIG. 7 is another schematic fragmentary side view illustrating the pivot frame at an extended position.

Referring to FIGS. 6 and 7, the second embodiment of the expandable child carrier according to the disclosure is different from the first embodiment in the configuration of the operation unit 5. The operation unit 5 of the second embodiment includes a handle 51, a knob 52, a latch member 53, a positioning seat 54 and an auxiliary link 55.

The handle 51 is pivoted to the base frame 21 at a pivot point. In one embodiment, the handle 51 has a holding portion 511.

The positioning seat 54 is fixedly mounted to the base frame 21, and is formed with two positioning grooves 541.

The latch member 53 is movably mounted to the handle 51, and removably engages either one of the positioning grooves 541 for positioning the handle 51 relative to the base frame 21. In one embodiment, the latch member 53 is movable along the handle 51

The knob 52 is movably mounted to the handle 51, and is associated with the latch member 53. In one embodiment, the knob 52 is co-movably connected to the latch member 53 so that depression of the knob 52 relative to the handle 51 in a second moving direction (D2, see FIG. 6) moves the latch member 53 in the second moving direction (D2) to disengage from one of the positioning grooves 541, so as to permit the handle 51 to pivot relative to the base frame 21.

The auxiliary link 55 has two opposite ends respectively pivoted to the pivot frame 31 and the handle 51, and cooperates with the pivot frame 31, the handle 51 and the base frame 21 to constitute a four-bar linkage. As such, the latch member 53 removably engages either one of the positioning grooves 541 of the positioning seat 54 for positioning the pivot frame 31 relative to the base frame 21 at a retracted position (see FIG. 6) or an extended position (see FIG. 7). Preferably, the auxiliary link 55 cooperates with the pivot frame 31, the handle 51 and the base frame 21 to constitute a parallel four-bar linkage.

In one embodiment, the holding portion 511 of the handle 51 is located at one side of the pivot point opposite to the auxiliary link 55, so a user can push the holding portion 511 forwardly (i.e., rotate the handle 51 in a second actuating direction (R2, see FIG. 6)) to move the pivot frame 31 toward the extended position, and can pull the holding portion 511 rearwardly to move the pivot frame 31 toward the retracted position. In a modification, the holding portion 511 may be located at one side of the pivot point the same to the auxiliary link 55, so the user can pull the holding portion 511 rearwardly (i.e., rotate the handle 51 in the second actuating direction (R2)) to move the pivot frame 31 toward the extended position.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An expandable child carrier comprising:
  a base frame;
  a pivot frame pivoted to said base frame;
  at least one first wheel unit mounted to said base frame;
  at least one second wheel unit mounted to said pivot frame, a distance between said at least one second wheel unit and said at least one first wheel unit being adjusted upon the pivotal movement of said pivot frame relative to said base frame; and
  a mount and a mount block, said mount being fixedly mounted to said base frame for being removably mounted with a seat, said mount block being co-movably mounted to said pivot frame for blocking said mount so as to prevent the seat to be mounted on said mount.

2. The expandable child carrier as claimed in claim 1, wherein said pivot frame is able to be positioned relative to said base frame at a retracted position and an extended position, the distance between said at least one second wheel unit and said at least one first wheel unit at the time that said pivot frame is at the retracted position being smaller than that at the time that said pivot frame is at the extended position.

3. The expandable child carrier as claimed in claim 2, wherein a distance between a ground and said base frame at the time that said pivot frame is at the retracted position is the same to that at the time that said pivot frame is at the extended position.

4. The expandable child carrier as claimed in claim 2, wherein said mount block blocking said mount so as to prevent the seat from being mounted on said mount when said pivot frame is at the retracted position, said mount block unblocking said mount so as to permit the seat to be mounted on said mount when said pivot frame is at the extended position.

5. The expandable child carrier as claimed in claim 1, further comprising a handle that is co-movably mounted to said pivot frame for manual operation.

6. The expandable child carrier as claimed in claim 5, further comprising a latch member and a positioning seat, said positioning seat being fixedly mounted to said base frame, and being formed with at least one positioning groove, said latch member being movably mounted to said handle, and removably engaging said at least one positioning groove for positioning said pivot frame relative to said base frame.

7. The expandable child carrier as claimed in claim 1, further comprising a handle that is pivoted to said base frame and that is associated with said pivot frame for manual operation.

8. The expandable child carrier as claimed in claim 7, further comprising a latch member, a positioning seat and an auxiliary link, said positioning seat being fixedly mounted to said base frame, and being formed with at least one positioning groove, said auxiliary link being pivoted to said handle and said pivot frame, and cooperating with said handle, said pivot frame and said base frame to constitute a four-bar linkage, said latch member being movably mounted to said handle, and removably engaging said at least one positioning groove for positioning said pivot frame relative to said base frame.

9. The expandable child carrier as claimed in claim 1, further comprising a mount and a mount block, said mount being fixedly mounted to said base frame for being removably mounted with a seat, said mount block being co-movably mounted to said pivot frame for blocking said mount so as to prevent the seat to be mounted on said mount.

10. The expandable child carrier as claimed in claim 1, wherein said at least one first wheel unit includes a first housing that is rotatably mounted to said base frame, and a first wheel that is rotatably mounted to said first housing.

11. An expandable child carrier comprising:
  a base frame;
  a pivot frame pivoted to said base frame;
  at least one first wheel unit mounted to said base frame;
  at least one second wheel unit mounted to said pivot frame, a distance between said at least one second wheel unit and said at least one first wheel unit being adjusted upon the pivotal movement of said pivot frame relative to said base frame;
  a handle that is co-movably mounted to said pivot frame for manual operation; and
  a latch member and a positioning seat, said positioning seat being fixedly mounted to said base frame, and being formed with at least one positioning groove, said latch member being movably mounted to said handle, and removably engaging said at least one positioning groove for positioning said pivot frame relative to said base frame.

12. The expandable child carrier as claimed in claim 11, wherein said pivot frame is able to be positioned relative to said base frame at a retracted position and an extended position, the distance between said at least one second wheel unit and said at least one first wheel unit at the time that said pivot frame is at the retracted position being smaller than that at the time that said pivot frame is at the extended position.

13. The expandable child carrier as claimed in claim 12, wherein a distance between a ground and said base frame at the time that said pivot frame is at the retracted position is the same to that at the time that said pivot frame is at the extended position.

14. The expandable child carrier as claimed in claim 12, further comprising a mount and a mount block, said mount being fixedly mounted to said base frame for being removably mounted with a seat, said mount block being co-movably mounted to said pivot frame, said mount block blocking said mount so as to prevent the seat from being mounted on said mount when said pivot frame is at the retracted position, said mount block unblocking said mount so as to permit the seat to be mounted on said mount when said pivot frame is at the extended position.

15. The expandable child carrier as claimed in claim 11, wherein said at least one first wheel unit includes a first housing that is rotatably mounted to said base frame, and a first wheel that is rotatably mounted to said first housing.

16. An expandable child carrier comprising:
a base frame;
a pivot frame pivoted to said base frame;
at least one first wheel unit mounted to said base frame;
at least one second wheel unit mounted to said pivot frame, a distance between said at least one second wheel unit and said at least one first wheel unit being adjusted upon the pivotal movement of said pivot frame relative to said base frame;
a handle that is pivoted to said base frame and that is associated with said pivot frame for manual operation; and
a latch member, a positioning seat and an auxiliary link, said positioning seat being fixedly mounted to said base frame, and being formed with at least one positioning groove, said auxiliary link being pivoted to said handle and said pivot frame, and cooperating with said handle, said pivot frame and said base frame to constitute a four-bar linkage, said latch member being movably mounted to said handle, and removably engaging said at least one positioning groove for positioning said pivot frame relative to said base frame.

17. The expandable child carrier as claimed in claim 16, wherein said pivot frame is able to be positioned relative to said base frame at a retracted position and an extended position, the distance between said at least one second wheel unit and said at least one first wheel unit at the time that said pivot frame is at the retracted position being smaller than that at the time that said pivot frame is at the extended position.

18. The expandable child carrier as claimed in claim 17, wherein a distance between a ground and said base frame at the time that said pivot frame is at the retracted position is the same to that at the time that said pivot frame is at the extended position.

19. The expandable child carrier as claimed in claim 17, further comprising a mount and a mount block, said mount being fixedly mounted to said base frame for being removably mounted with a seat, said mount block being co-movably mounted to said pivot frame, said mount block blocking said mount so as to prevent the seat from being mounted on said mount when said pivot frame is at the retracted position, said mount block unblocking said mount so as to permit the seat to be mounted on said mount when said pivot frame is at the extended position.

* * * * *